US012719792B2

(12) United States Patent
Abdelsalam et al.

(10) Patent No.: US 12,719,792 B2
(45) Date of Patent: Aug. 25, 2026

(54) FORCEFUL FLOW TERMINATION FOR ACCELERATED NETWORKING

(71) Applicant: Microsoft Technology Licensing, LLC, Redmond, WA (US)

(72) Inventors: Ahmed Abdelsalam, Redmond, WA (US); Osman Nuri Ertugay, Bellevue, WA (US); Zachary Noel Libby, Snoqualmie, WA (US); Narayanan Ravichandran, Redmond, WA (US); Rohan Kandi, Bellevue, WA (US); Milan Dasgupta, Seattle, WA (US); Anshuman Verma, Redmond, WA (US); Lok Chand Koppaka, Bothell, WA (US); Harish Srinivasan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 155 days.

(21) Appl. No.: 18/821,226

(22) Filed: Aug. 30, 2024

(65) Prior Publication Data

US 2026/0067217 A1 Mar. 5, 2026

(51) Int. Cl.

*H04L 45/76* (2022.01)
*H04L 45/00* (2022.01)

(Continued)

(52) U.S. Cl.

CPC .............. *H04L 45/76* (2022.05); *H04L 45/38* (2013.01); *H04L 47/193* (2013.01); *H04L 47/266* (2013.01)

(58) Field of Classification Search

CPC ....... H04L 45/76; H04L 45/38; H04L 47/193; H04L 47/266

(Continued)

(56) References Cited

U.S. PATENT DOCUMENTS 8,185,615 B1 * 5/2012 McDysan ........... H04L 41/0894 370/230.1
8,891,532 B1 * 11/2014 Smith ................... H04L 69/161 370/395.52

(Continued)

FOREIGN PATENT DOCUMENTS

CN 101247353 A 8/2008
EP 1775898 B1 * 10/2013 ........... H04L 47/193
WO WO-2016162833 A1 * 10/2016 ............. H04L 47/12

OTHER PUBLICATIONS

Extended European search report received for European Application No. 25197005.9, mailed on Jan. 9, 2026, 08 pages.

*Primary Examiner* — Anthony Mejia
(74) *Attorney, Agent, or Firm* — Holzer Patel Drennan

(57) ABSTRACT

A method of forcefully terminating a flow includes identifying, by a hardware accelerator, a flow entry in a flow table corresponding to a flow determined to satisfy predefined criteria for flow termination and transmitting, by the hardware accelerator, a flow termination request to a software-based reset packet generator. The flow termination request includes flow match characteristics included in the flow entry of the flow table. The method further includes generating, at the software-based reset packet generator, a first transport control protocol (TCP) reset packet with header information matching the flow match characteristics and transmitting the first TCP reset packet to the hardware accelerator. The method still further provides for transforming the first TCP reset packet, at the hardware accelerator, according to a first transformation defined in the flow entry. The transformed TCP reset packet is transmitted to the destination device and the flow entry is deleted from the flow table.

20 Claims, 4 Drawing Sheets

(51) Int. Cl.
*H04L 47/193* (2022.01)
*H04L 47/26* (2022.01)

(58) Field of Classification Search
USPC .......................................................... 709/238
See application file for complete search history.

(56) References Cited

U.S. PATENT DOCUMENTS

| | | | | |
|---|---|---|---|---|
| 9,559,948 | B2 * | 1/2017 | Narayanan | H04L 49/25 |
| 10,802,885 | B2 * | 10/2020 | Lee | H04L 47/125 |
| 11,902,404 | B1 * | 2/2024 | Arora | H04L 43/026 |
| 2007/0008884 | A1 * | 1/2007 | Tang | H04L 47/283 370/230 |
| 2007/0180526 | A1 * | 8/2007 | Copeland | H04L 63/1416 709/224 |
| 2014/0226548 | A1 * | 8/2014 | Son | H04W 76/25 370/311 |
| 2015/0289262 | A1 * | 10/2015 | Cha | H04L 43/00 370/252 |
| 2016/0150055 | A1 * | 5/2016 | Choi | H04L 69/22 370/401 |
| 2024/0292264 | A1 * | 8/2024 | Kanamarlapudi | H04L 47/193 |
| 2025/0260631 | A1 * | 8/2025 | Barsheshet | G06T 5/70 |

* cited by examiner

100

SDN Accelerator 106

Connection Terminator 120

Flow Table 116

VM1 102

VM2 104

Transformed TCP Reset Packet 114b

Transformed TCP Reset Packet 122b

Flow Termination Request 122

TCP Reset Packet 112a

*Source: VM1*
*Destination: VM2*

TCP Reset Packet 114b

*Source: VM2*
*Destination: VM1*

Software-Based Reset Packet Generator 108

FORCEFUL FLOW TERMINATION FOR ACCELERATED NETWORKING

BACKGROUND

Many cloud computing platforms utilize software-defined networking (SDN) devices to manage traffic flows between endpoints within virtual networks. SDN devices use software-based controllers or application programming interfaces (APIs) implemented in dedicated hardware to determine where to send traffic while communicating with an underlying hardware architecture that forwards the traffic.

In some systems, SND routing logic is implemented by software executed by general-purpose servers. For example, a central processing unit (CPU) of the server is used to perform flow admission tasks such as evaluating routing policies and defining each new flow (connection), while routing tasks (e.g., flow transform operations) are offloaded to one or more smart network interface controllers (smart NICs) within the server. Due to the limited port availability of smart NICs, more modern approaches to SDN are trending toward the use of hardware accelerators, also referred to as "SDN accelerators," that implement routing tasks (packet transformations) in specially-purposed hardware rather than smart NICs. Specially-purposed hardware solutions include, for example, specially-purposed FPGAs (field programmable gate arrays) and programmable switch application-specific integrated circuits ASICs.

SUMMARY

According to one implementation, a method of forcefully terminating transport control protocol (TCP) flows at a hardware accelerator includes identifying a flow entry in a flow table of a hardware accelerator corresponding to a flow that satisfies predefined criteria for flow termination and transmitting a flow termination request for the flow to a software-based reset packet generator. The flow termination request includes flow match characteristics for the flow extracted from the flow entry of the flow table. The method further includes generating, at the software-based reset packet generator, a first TCP reset packet that includes the flow match characteristics for the flow; transmitting, by the software-based reset packet generator, the first TCP reset packet to the hardware accelerator; and transforming the first TCP reset packet at the hardware accelerator according to a first transformation defined in the flow entry. The hardware accelerator transmits the transformed TCP reset packet to a destination address specified in the header of the transformed packet and deletes the flow entry from the flow table.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

When two devices communicate via a transport protocol layer (TCP) connection, a common way to terminate the connection is for one of the two devices to transmit a TCP reset packet, sometimes referred to as an RST packet, to the other device. The TCP reset packet sets a "reset" flag bit in the TCP header to 1, which tells the receiving device to stop using the connection, release resources allocated to the connection, and erase connection information.

When managing flows within a network, there exist scenarios where it is beneficial for an intermediary routing device—e.g., a hardware accelerator—to be able to terminate a flow to free up resources independently. For example, an SDN accelerator may be configured with logic for self-identifying and terminating inactive flows to conserve storage waste, such as by deleting state information of select flows from a locally stored flow table, which renders traffic of those flows unrouteable. However, because it is computationally expensive for the SDN accelerator (with limited processing power) to generate data packets, it is not computationally feasible within a large-scale system to task the SDN accelerator with notifying the endpoints to a flow when the flow is centrally terminated. Consequently, the endpoint devices (e.g., virtual machines (VMs)) continue to periodically "check" on the terminated flow by sending packets that are not acknowledged, time-out, and that are resent multiple times before the endpoint devices eventually independently determine that the flow has been terminated. This flow termination method is highly inefficient and unnecessarily ties up resources on the endpoint devices for an extended period of time after the flow has been terminated.

The herein-disclosed technology provides an architectural solution including a hardware accelerator with a mechanism for notifying endpoints to a flow when the hardware accelerator forcefully terminates the flow. The method utilizes the TCP reset packet as the endpoint notification mechanism and provides for generating the TCP reset packet(s) in a low-cost manner that does not require the SDN accelerator to be specially designed to support packet generation. Additionally, the herein-disclosed flow termination methodology avoids the need to offload any packet transformation tasks to software, which would introduce considerable latencies if implemented as part of a routine flow eviction process by a hardware accelerator managing flows between thousands or millions of nodes in a virtual network.

Figure 1:
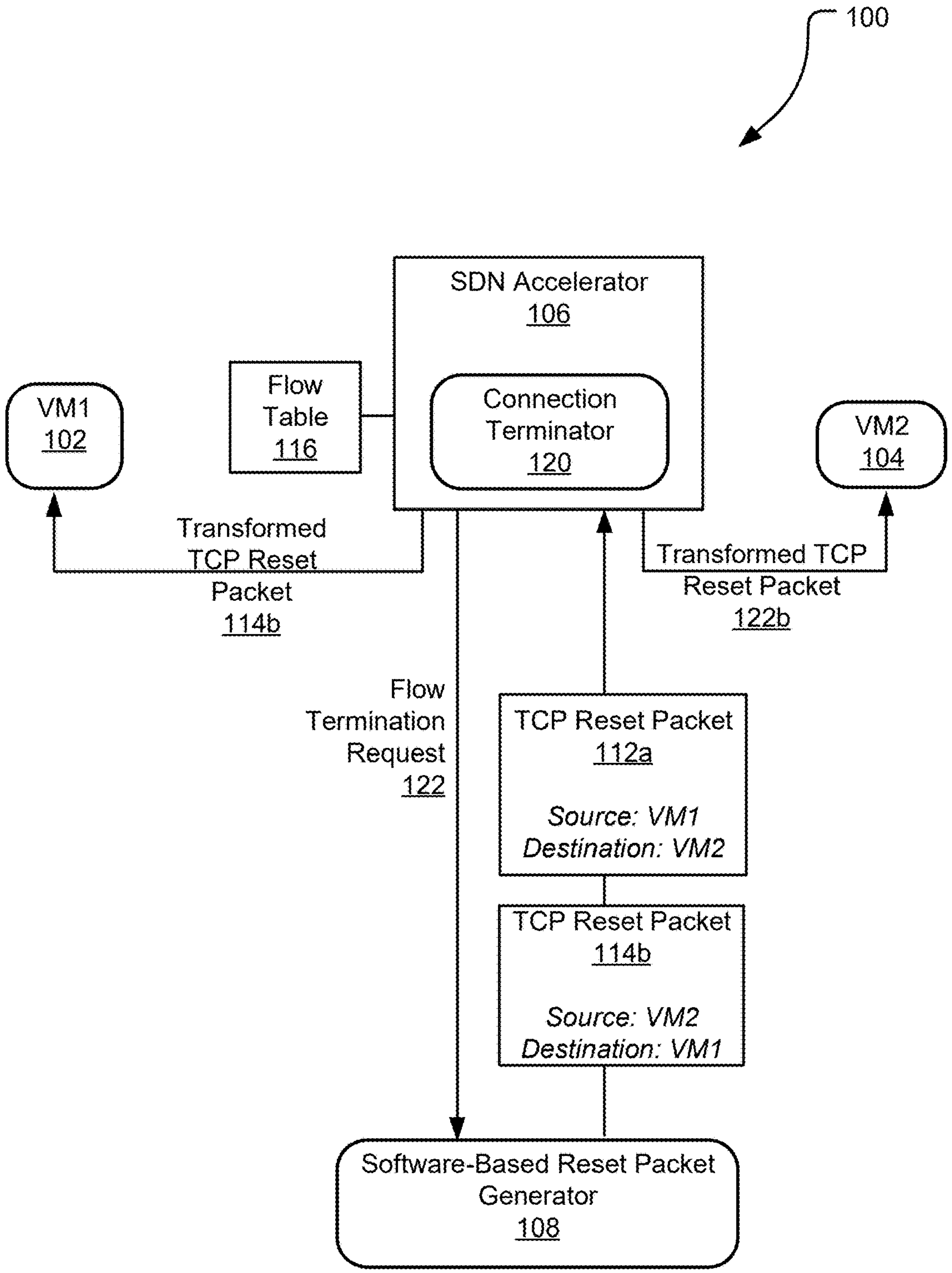
FIG. 1 illustrates an example virtual network with an accelerated networking architecture that supports forceful termination with endpoint notification.

FIG. 1 illustrates an example virtual network 100 with an accelerated networking architecture that supports forceful termination with endpoint notification. The virtual network 100 includes an SDN accelerator 106, which is a type of hardware accelerator specially-purposed to provide routing functionality within virtual networks. In one implementation, the SDN accelerator 106 is a programmable switch ASIC that supports a combination of (fixed) vendor-supplied logic and programmable firmware. In another implementation, the SDN accelerator 106 is a field programmable gate array (FPGA) that likewise supports vendor-supplied logic and programmable firmware. In both implementations, the programmable firmware executes an abstract application programming interface (API) to communicate with a software-based reset packet generator 108, as generally described below. The software-based reset packet generator 108 is, in one implementation, a software application executed by a general-purpose server.

Data packets traveling between VMs in the virtual network 100 are routed through the SDN accelerator 106, which manages and stores connection state data for active flows in a flow table 116. The SDN accelerator 106 is tasked with performing table look-up operations and packet transform operations. In some implementations, the SDN accelerator 106 also performs flow admission operations for identifying a packet transformation for each new flow (e.g., selecting an endpoint to route the flow to and a packet header transformation to achieve that routing) as well as operations for updating the flow table 116 to include each newly-created flow. In other implementations, the SDN accelerator 106 offloads flow admission operations to software components not pictured in FIG. 1.

The flow table 116 is a match-action table that stores, for each flow, a flow entry that includes a set of "flow match characteristics" and a corresponding "action." The flow match characteristics specify a set of packet header characteristics that, when present in the header of a received data packet, suffice to trigger the application of the corresponding action. For example, the flow match characteristics may specify a source internet protocol (IP) address, source port, destination IP address, and destination port, the combination of which is unique to incoming packets of the flow. The "action" stored in each flow entry is a packet transformation that alters some aspect of the packet header to support routing a select endpoint, such as by changing packet header fields, encapsulating the data packet, etc.

In one implementation, each flow entry in the flow table 116 defines a one-way flow. Therefore, for each forward-direction flow defined within the flow table 116 that specifies a first address as a source and a second address as a destination, there exists a corresponding reverse-direction flow entry in the flow table 116 that specifies the second address as the source and the first address as the destination.

In FIG. 1, the SDN accelerator 106 is shown to include a connection terminator 120. The connection terminator 120 analyzes flow metrics of the virtual network 100 for the flows in the flow table 216 in view of various rules that dictate when flows are to be forcefully terminated, initiating forceful terminations of select pairs of flows (e.g., corresponding forward-direction and reverse-direction flows) in accordance with the rules. In one implementation, the connection terminator 120 comprises processor-executable instructions stored in memory (e.g., Flash memory) of the SDN accelerator 106 executed by a processor or microprocessor local to the SDN accelerator 106. The connection terminator 120 executes connection termination logic that assesses satisfaction of different conditions that, when satisfied, trigger forceful flow termination.

In response to identifying a pair of flows in the flow table 116 with corresponding traffic metrics that satisfy predefined criteria for flow termination, the connection terminator 120 transmits a flow termination request 122 to the software-based reset packet generator 108. The flow termination request 122 request includes flow information extracted from the flow table 116, including the flow match characteristics of the flow(s) selected for forceful termination. If, for example, the SDN accelerator 106 is requesting termination of a pair of flows (e.g., the forward-direction flow and corresponding reverse-direction flow) between a first VM 102 and a second VM 104, the flow termination request specifies source IP address, source port, destination IP address, and destination port each flow of the pair. In some implementations, the flow termination request 122 includes both the "match" and "action" information in the flow table 116 for the flow(s) selected for termination. In other implementations, the flow termination request 122 includes the "match" information but does not include the "action" information.

In addition to sending the flow termination request 122 to initiate the forceful termination of a bidirectional flow pair, the SDN accelerator 106 updates state information in the flow table 116 to place the flows in a "pending termination" state. This state update causes the SDN accelerator 106 to ready itself to receive incoming TCP reset packets from the software-based reset packet generator 108. This flow state update ensures that the SDN accelerator 106 does not continue forwarding through traffic between endpoints of the flows. That is, after the "pending termination" update is affected for a pair of flows, the SDN accelerator 106 does not forward on any additional data packets of the flow(s) except for the TCP reset packets that are generated by and received from the software-based reset packet generator 108, as is generally described below.

In addition to the above, the "pending termination" state updates to the flow table 116 may serve to initiate a timer of the SDN accelerator 106. If the TCP reset packets are not received for the pair of flows before the timer expires, the SDN accelerator 106 forcefully terminations the flows anyway (e.g., without endpoint notification). This ensures that latency and connectivity issues isolated to the software-based reset packet generator 108 do not impede the efficiency and performance of the SDN accelerator 106.

In response to receiving the flow termination request 122, the software-based reset packet generator 108 generates a pair of TCP reset packets, shown in FIG. 1 as a first TCP reset packet 112*a* and a second TCP reset packet 114*a*. Each of the generated TCP reset packets includes a header that identifies that packet as belonging to a respective one of the forward-direction and reverse-direction flows between the first VM 102 and the second VM 104. For example, the first TCP reset packet 112*a* includes a header that identifies an IP address and port of the first VM 102 as the packet source and an IP address and port of the second VM 104 as the packet destination. Likewise, a second TCP packet 114*a* of the pair includes a header that identifies an IP address and port of the second VM 104 as the packet source and an IP address and port of the first VM 102 as the packet destination. The TCP reset flag bit (in the header) is set to 1 within each packet.

Notably, the software-based reset packet generator 108 does not perform the corresponding packet transform operations defined in the flow table 116 for the corresponding forward-direction and reverse-direction flows between the first VM 102 and the second VM 104. Instead, the software-based reset packet generator 108 transmits the pair of TCP reset packets (112 and 114) back to the SDN accelerator 106. This methodology reduces resource utilization and decreases latency compared to alternative implementations that utilize the software-based reset packet generator 108 to perform packet transform operations. This is because the SDN accelerator 106 performs packet transform operations much more efficiently (with lower latency) than a software process executing on a general-purpose server's central processing unit (CPU). Moreover, the above-described methodology eliminates the need for the SDN accelerator 106 to transmit the packet transformation information to the software-based reset packet generator 108, along with the flow characteristics for each of the flows selected for termination, thereby reducing duplicative storage that would otherwise occur.

Upon being received at the SDN accelerator 106, the first TCP reset packet 112*a* is recognized and handled in the same manner as it would be if it had been independently generated and transmitted by the first VM 102. The SDN accelerator 106 compares the header of the first TCP reset packet 112 to the flow match characteristics of various entries in the flow table 116, identifies the corresponding flow entry, and performs the packet transformation operation that is defined within the flow entry. This packet transform operation outputs a transformed TCP reset packet 112*b* that is forwarded to its respective destination (e.g., a physical host of the second VM 104 that then delivers the packet to the second VM 104). The SDN accelerator 106 handles the second TCP reset packet 114*b* for the reverse-direction flow in an identical manner—e.g., by identifying the corresponding flow entry in the flow table 116 and applying the transform defined in the flow entry to generate a transformed TCP reset packet 114*b* that is forwarded on to its respective destination (e.g., a physical host of the first VM 102).

After forwarding the transformed TCP reset packets 114*b* and 122*b*, the SDN accelerator 106 updates the flow table 116 to delete the corresponding flow entries used to transform the TCP reset packets 112*a* and 114*b*. This action may either be performed immediately, or after some period of time that allows the SDN accelerator 106 to confirm receipt of the transformed TCP reset packets 112*a* and 114*b* by the respective VM endpoints.

Per the above-described TCP reset packet generation and transform methodology, the first VM 102 and the second VM 104 are notified when the corresponding pair of flows between them are centrally terminated by the SDN accelerator 106. This notification allows those endpoint VMs to immediately free up resources allocated to the respective terminated flows and rededicate those resources to other processes as opposed to unnecessarily tying up those resources for an extended period of time, as is the case in scenarios of forceful termination without endpoint notification.

Figure 2:
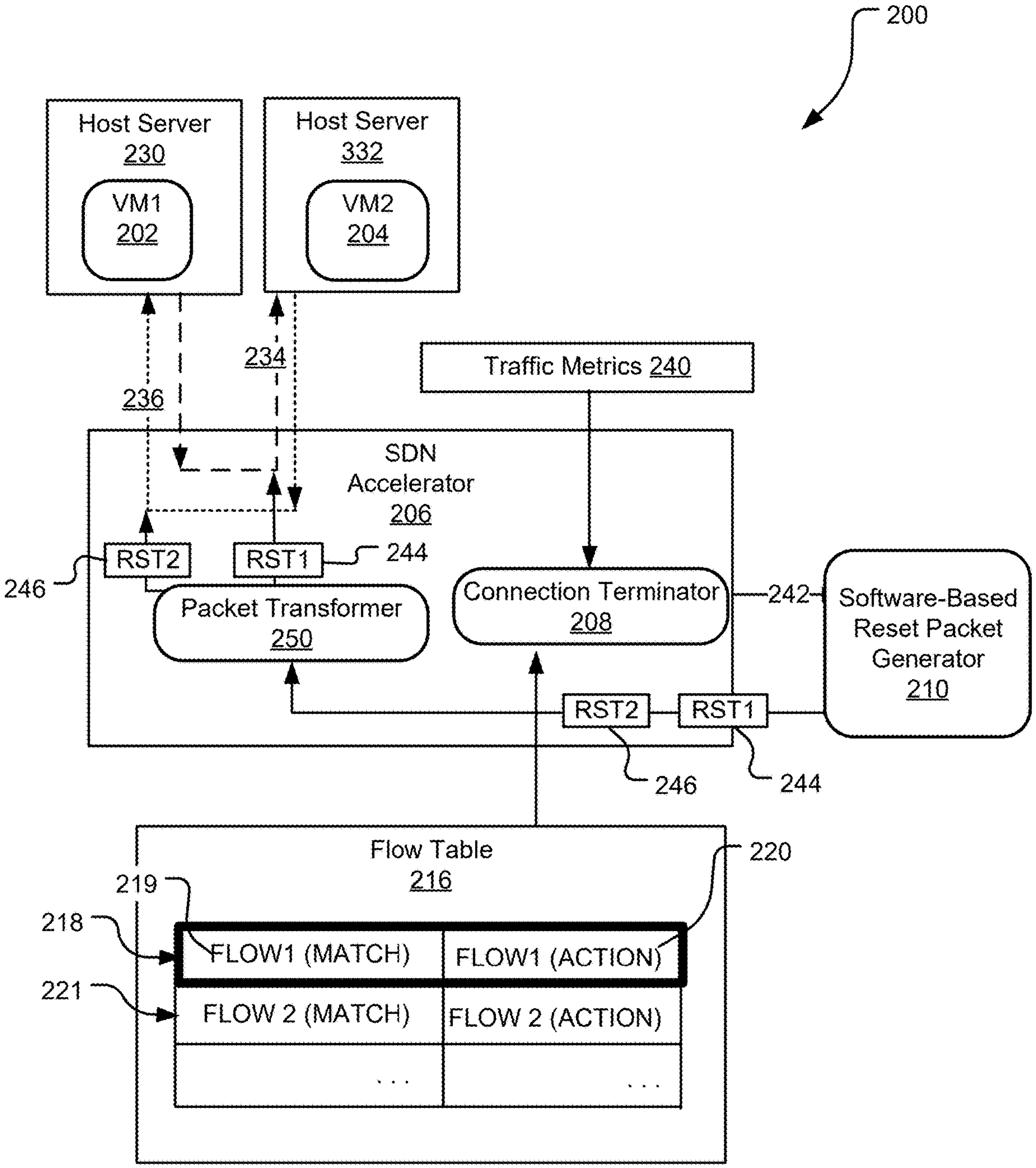
FIG. 2 illustrates additional aspects of an example virtual network with an accelerated networking architecture that supports forceful flow termination with endpoint notification.

FIG. 2 illustrates additional aspects of an example virtual network 200 with an accelerated networking architecture that supports forceful flow termination with endpoint notification. The virtual network 200 includes an SDN accelerator 206 that performs packet transform and forwarding operations to direct packets in route between different VMs in the virtual network 200.

In one implementation, the virtual machines in the virtual network 200 communicate using private internet protocol (IP) addresses. Although private IP addresses cannot be used to address traffic across the internet, traffic of the virtual network 200 can still be routed between internet-facing servers due to routing logic within the SDN accelerator 106 that allows the private IP addresses of the VMs to be mapped to public IP addresses of respective physical servers that host the VMs of the virtual network 100. Specifically, the SDN accelerator 206 manages a flow table 216 that includes a corresponding flow entry 218 for each of the multiple active flows within the virtual network 200. The flow table 216 is a match-action table that includes, for each different flow, a set of flow match characteristics 219 (e.g., source IP address, source port, destination IP address, and destination port) and a corresponding action 220 (e.g., a packet transform operation). The SDN accelerator 206 compares packet header information of each incoming data packet to the flow match characteristics in the different flow entries of the flow table 216 and, upon identifying a flow entry with flow match characteristics matching the header information of the data packet, transforms the data packet according to the packet transform operation defined with the matching flow entry.

To help illustrate routing fundamentals within the virtual network 200, FIG. 2 includes a first VM 202 that is shown to execute on a first host server 230 and a second VM 204 that executes on a second host server 232. To establish a new flow (shown in FIG. 2 as a forward-direction flow 234), the first VM 202 transmits a TCP SYN packet to a private IP address of the second VM 204. Before leaving the first host server 230, the outgoing TCP SYN packet is encapsulated to include an outer header that identifies a public IP address of the first host server 230 as the packet source and a public IP address of the SDN accelerator 206 as the packet destination.

Upon receiving the TCP SYN packet, in the above-described example, the SDN accelerator 206 strips the outer header (decapsulates the packet) and reads the inner (original) packet header, which identifies the private IP addresses of the first VM 102 and the second VM 104. The SDN accelerator 206 further determines that the TCP SYN flag is set in the header, which indicates the packet is the first packet of a new flow. Based on the presence of the TCP SYN flag, the SDN accelerator 206 subjects the TCP SYN packet to various flow admission processing operations that collectively serve to identify a packet transform sufficient to direct the packets of the forward-direction flow 234 to the second VM 204. In the illustrated example, the packet transform may entail updating the destination address to identify the public IP address of the second host server 232 and a port ID corresponding to the second VM 204 and updating the source address of the data packet to identify the public IP address of the first host server 230 and a port ID corresponding to the first VM 202. In another implementation, this packet transform entails encapsulating the data packet to include an outer header including the public IP addresses of the first host server 230 (as the source) and the second host server 232 (as the destination).

After the appropriate packet transform is identified for the forward-direction flow 234, the flow table 216 is updated to include a new flow entry 218 (e.g., FLOW1) that includes the flow match characteristics extracted from the header of the TCP SYN packet as well as the identified packet transformation. The TCP SYN packet is then transformed according to the packet transformation, forwarded to its destination host server (e.g., the second host server 232), and delivered by that host server to its destination VM (e.g., the second VM 204). Subsequent incoming packets of the forward-direction flow 234 are subjected to the same packet transformation and forwarding operations as the TCP SYN packet.

Upon receiving the first data packet of the forward-direction flow 234, the second VM 204 transmits an acknowledgment (e.g., a first packet of a reverse-direction flow 236) that is redirected by the second host server 232, to the SDN accelerator 206, which performs the actions similar to those described above to create another new flow entry 221 (e.g., FLOW2) in the flow table 216 that identifies the flow match characteristics and corresponding packet transformation for the reverse-direction flow 236. The acknowledgement and all subsequent incoming packets of the reverse-direction flow 236 are subjected to the packet transformation defined in the flow entry 221 and forwarded, per the destination address of the transformed packet header (the first host server 230).

The SDN accelerator 206 includes a connection terminator 208 that monitors traffic metrics 240 for all flows in the flow table 216. For example, the traffic metrics may include metrics tracked in association with each flow, such as packet frequency, time-of-last-received-packet, total number of packets transmitted in the flow, latency statistics, and more. The connection terminator 208 enforces flow termination logic that provides rules for forcefully terminating flows when the corresponding traffic metrics 240 satisfy predefined eviction criteria.

In one implementation, the flow termination logic provides for evicting (deleting) a pair of corresponding (e.g., opposing-direction) flows between the same pair of endpoints when the traffic metrics 240 indicate that a packet has not been observed along either of the corresponding flows for a threshold period of time. If, for example, the connection terminator 208 sees that packets have not been sent along the forward-direction flow 234 or the reverse-direction flow 236 for the past 10 minutes, the connection terminator 208 may determine that the predefined eviction criteria are satisfied. In response to this determination, the connection terminator 208 transmits a flow termination request 242 to a software-based reset packet generator 210. The flow termination request includes the flow match characteristics for the forward-direction flow 234 and the flow match characteristics for the corresponding reverse-direction flow 236.

In response to receiving the pair of flow termination requests 242, the software-based reset packet generator 210 generates a first TCP reset packet 244 and a second TCP reset packet 246. The first TCP packet 244 includes a packet header that matches the flow match characteristics of the forward-direction flow 234 (e.g., a source address that identifies the private IP address and a port ID of the first VM 202 and a destination address that identifies the private IP address and a port ID of the second VM 204). Likewise, the second TCP reset packet 246 includes a packet header that matches the flow match characteristics of the reverse-direction flow 236 (e.g., a source address that identifies the private IP address and the port ID of the second VM 204 and a destination address that identifies the private IP address and the port ID of the first VM 202). The packet headers of the first TCP reset packet 244 and the second TCP reset packet 246 also each include a TCP reset flag bit that is set to "1."

Notably, the software-based reset packet generator 210 does not perform the packet transform operations defined in the flow table 216 for the forward-direction flow 234 and the reverse-direction flow 236. Instead, the software-based reset packet generator 108 transmits the pair of TCP reset packets (112 and 114) to a packet transformer 250 of the SDN accelerator 206, where the packets are transformed according to their respective packet transformations defined in the flow table 216 before being forwarded to their respective destinations.

Ultimately, the second host server 232 of the second VM 204 receives the first TCP reset packet 244 and delivers it to the second VM 204, while the first host server 230 of the first VM 202 receives the second TCP reset packet 246 and delivers it to the first VM 202. Upon receiving the first TCP reset packet 244, the second VM 204 releases all resources allocated to supporting the forward-direction flow 234 and erases all associated connection information stored locally on the second VM 204. Likewise, upon receiving the second TCP reset packet 246, the first VM 202 releases all resources allocated to supporting the reverse-direction flow 236 and erases all associated connection information stored locally on the first VM 202.

After the above-described packet transformation and forwarding actions performed on the first TCP reset packet 244 and the second TCP reset packet 246, the SDN accelerator 206 deletes the flow entries 218 and 221 in the flow table 216, which correspond to the forward-direction flow 234 and the reverse-direction flow 236, respectively. In some implementations, the SDN accelerator 206 waits to receive the acknowledgments to the first TCP packet 244 and the second TCP packet 246 before evicting the corresponding flow from the flow table 216, as this facilitates a time-out and retry in scenarios where initial transmission fails due to connection issues or other causes.

Since the SDN accelerator 206 has limited storage, the ability to evict inactive flows from the flow table 216 affords the SDN accelerator 206 the critical capability to self-manage resource (e.g., storage) waste. The above-described capability of the SDN accelerator 206 to notify the VM endpoints of each terminated flow (via a TCP reset packet) further decreases resource waste by allowing the VM endpoints to release and reallocate local resources devoted to the terminated flow promptly.

Figure 3:
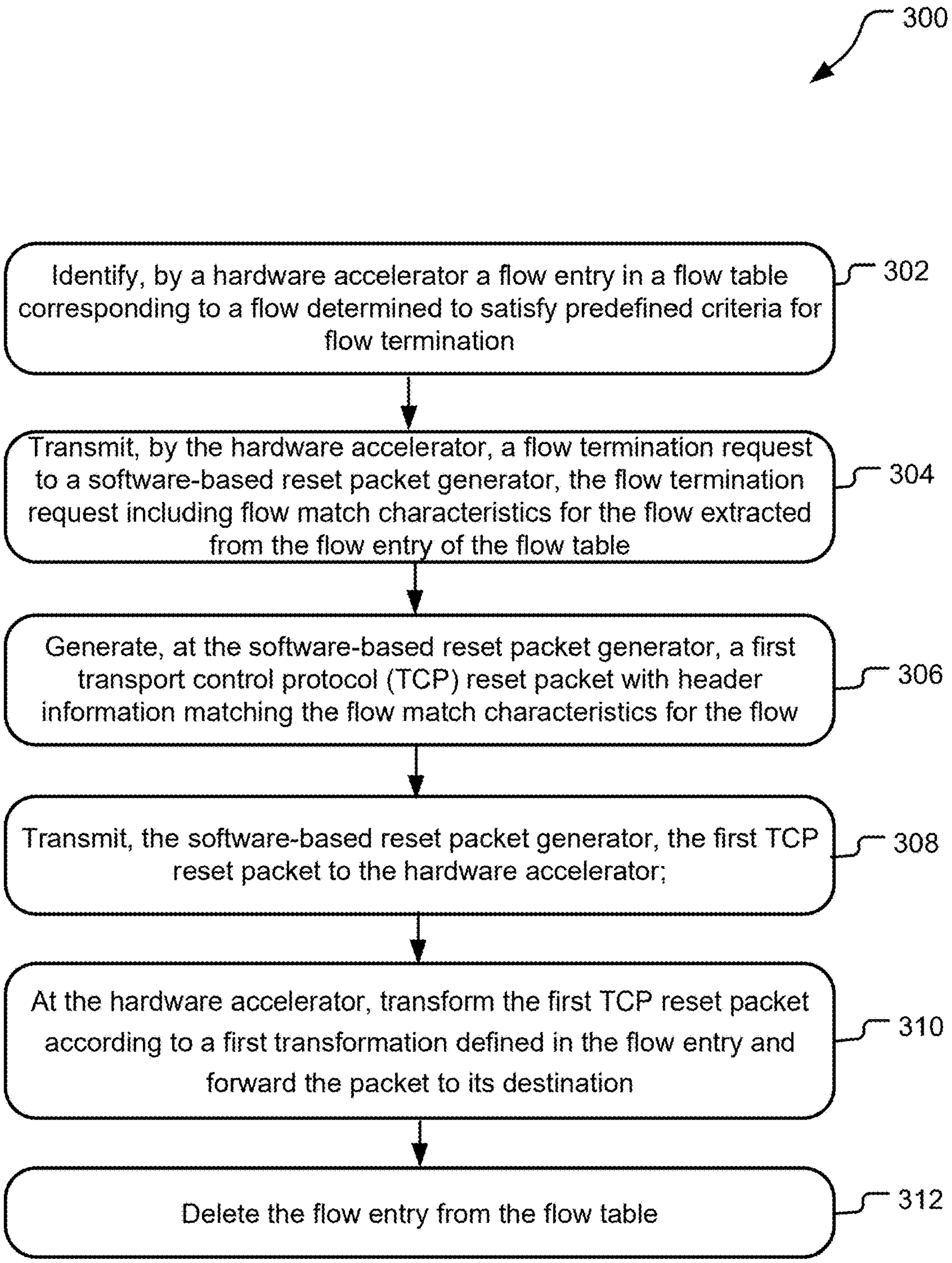
FIG. 3 illustrates example operations for forcefully terminating a flow between endpoints in a virtual network.

FIG. 3 illustrates example operations 300 for forcefully terminating a flow between endpoints in a virtual network. An identifying operation 302 identifies a flow entry in a flow table corresponding to a flow determined to satisfy predefined criteria for flow termination. A hardware accelerator maintains the flow table. In implementation, the hardware accelerator obtains and analyzes network traffic metrics to assess the satisfaction of the predefined criteria for flow termination. For example, the hardware accelerator identifies pairs of opposing-direction flows between the same set of IP addresses and ports that have not transmitted any packets within a threshold period of time. In another implementation, flow termination assessment is performed by an entity external to the hardware accelerator. For example, a server-executed software component analyzes the traffic metrics to select flows for forceful termination and then instructs the hardware accelerator to delete the select flows from the flow table.

The hardware accelerator performs a first transmittal operation 304, which entails transmitting a flow termination request to a software-based reset packet generator. The flow termination request includes flow match characteristics for the flows that are selected for forceful termination ("the selected flows"). In some implementations, the hardware accelerator also updates state information in the flow table to place the selected flows in a "pending termination" state, which serves to ensure that the SDN accelerator stops forwarding nominal traffic between endpoints of the selected flows. That is, after a flow is placed in the "pending termination" state, the incoming TCP reset packet is the sole subsequently packet that the SDN accelerator forwards along the flow. In one implementation, the placement of a flow in the "pending termination" state also initiates a timer in association with the flow. If the expires before a TCP reset packet is received for the flow, the SDN accelerator terminates the flow without endpoint notification.

In response to receiving the flow termination request, the software-based reset packet generator generates a first TCP reset packet with header information matching the flow match characteristics for the flow. The software-based reset packet generator performs a second transmittal operation 308, which entails transmitting the first TCP reset packet to the hardware accelerator. The hardware accelerator receives the first TCP packet and, in response, performs a transformation operation 310 that transforms the first TCP reset packet according to a first transformation defined in the flow entry. The hardware accelerator then forwards the packet to the destination address specified in the packet following the transformation operation 310.

A flow table update operation 312 deletes the flow entry from the flow table. In some implementations, deletion of the flow entry is contingent upon receiving, at the hardware accelerator, an acknowledgment of the first TCP reset packet.

Figure 4:
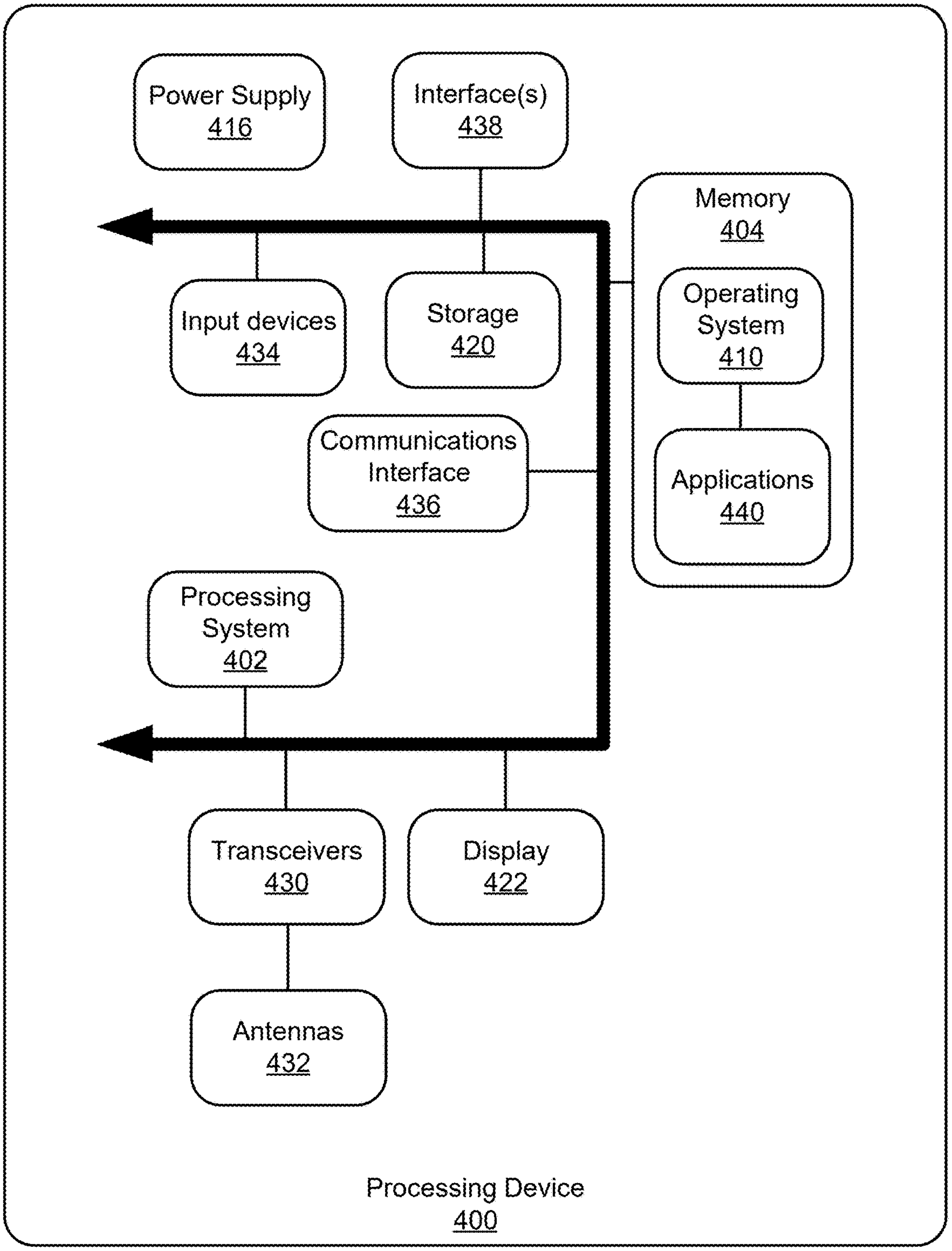
FIG. 4 illustrates an example schematic of a processing device suitable for implementing aspects of the disclosed technology.

FIG. 4 illustrates an example schematic of a processing device 400 suitable for implementing aspects of the disclosed technology. The processing device 400 includes a processing system 402, memory 404, a display 422, and other interfaces 438 (e.g., buttons). The processing system 402 may have one or more computer processing units (CPUs), graphics processing units (GPUs), etc.

The memory 404 generally includes both volatile memory (e.g., random access memory (RAM)) and non-volatile memory (e.g., flash memory). An operating system 410 resides in the memory 404 and is executed by the processing system 402. One or more applications 440 (e.g., the connection terminator 120 or the software-based reset packet generator 108 of FIG. 1) are loaded in the memory 404 and executed on the operating system 410 by the processing system 402. In some implementations, aspects of the flow admission service of FIG. 1 are loaded into memory of different processing devices connected across a network. The applications 440 may receive inputs from one another as well as from various input local devices 434 such as a microphone, input accessory (e.g., keypad, mouse, stylus, touchpad, gamepad, racing wheel, joystick), or a camera.

Additionally, the applications 440 may receive input from one or more remote devices, such as remotely-located servers or smart devices, by communicating with such devices over a wired or wireless network using more communication transceivers 430 and an antenna 432 to provide network connectivity (e.g., a mobile phone network, Wi-Fi®, Bluetooth®). The processing device 400 may also include one or more storage devices 420 (e.g., non-volatile storage). Other configurations may also be employed. In one implementation, the software-based reset packet generator 108 of FIG. 1 is an application executing on the processing device 400 or as a distributed application with different components executing on many different devices, such as many different devices that respectively receive flow termination requests from different instances of an SDN accelerator.

The processing device 400 further includes a power supply 416, powered by one or more batteries or other power sources and which provides power to other components of the processing device 400. The power supply 416 may also be connected to an external power source (not shown) that overrides or recharges the built-in batteries or other power sources.

The processing device 400 may include a variety of tangible computer-readable storage media and intangible computer-readable communication signals. Tangible computer-readable storage can be embodied by any available media that can be accessed by the processing device 400 and includes both volatile and nonvolatile storage media, removable and non-removable storage media. Tangible computer-readable storage media excludes intangible and transitory communications signals and includes volatile and nonvolatile, removable, and non-removable storage media implemented in any method or technology for storage of information such as computer-readable instructions, data structures, program modules, or other data. Tangible computer-readable storage media includes RAM, read-only memory (ROM), electrically erasable programmable read-only memory (EEPROM), flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 400. In contrast to tangible computer-readable storage media, intangible computer-readable communication signals may embody computer-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. For example, intangible communication signals include wired media such as a wired network or direct-wired connection, and wireless media such as acoustic, radio frequency (RF), infrared, and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a particular operation segment. The instructions may be implemented using any suitable high-level, low-level, object-oriented, visual, compiled, and/or interpreted programming language.

In some aspects, the techniques described herein relate to a method for forcefully terminating a flow between a source device and a destination device in a network, the method including: identifying, by a hardware accelerator, a flow entry in a flow table corresponding to a flow determined to satisfy predefined criteria for flow termination; transmitting, by the hardware accelerator, a flow termination request for the flow to a software-based reset packet generator, the flow termination request including flow match characteristics for the flow extracted from the flow entry of the flow table; generating, at the software-based reset packet generator, a first transport control protocol (TCP) reset packet that includes the flow match characteristics for the flow; transmitting, by the software-based reset packet generator, the first TCP reset packet to the hardware accelerator; at the hardware accelerator, creating a transformed TCP reset packet by transforming the first TCP reset packet according to a first transformation defined in the flow entry; transmitting, by the hardware accelerator, the transformed TCP reset packet to the destination device; and deleting the flow entry from the flow table.

In some aspects, the techniques described herein relate to a method, further including: identifying, from the flow table, a reverse-direction flow that transports data packets from the destination device to the source device; and assessing traffic metrics for the flow and the reverse-direction flow, wherein the predefined criteria for flow termination are satisfied when no packets have been received at the hardware accelerator for either the flow or the reverse-direction flow for a threshold period of time.

In some aspects, the techniques described herein relate to a method, wherein the method further includes: transmitting a flow termination request to the software-based reset packet generator, the flow termination requesting generation of the first TCP reset packet for the flow and a second TCP reset packet for the reverse-direction flow.

In some aspects, the techniques described herein relate to a method, wherein the method further includes: generating a pair of TCP reset packets at the software-based reset packet generator, the pair of TCP reset packets including the first TCP reset packet for the flow and a second TCP reset packet for the reverse-direction flow; transmitting the pair of TCP reset packets from the software-based reset packet generator to the hardware accelerator; transforming, by the hardware accelerator, second TCP reset packet according to a transformation defined with a flow entry corresponding to the reverse-direction flow within the flow table; and subsequent to transforming the second TCP reset packet, transmitting the second TCP reset packet to the source device.

In some aspects, the techniques described herein relate to a method, wherein the hardware accelerator is either a field programmable gate array (FPGA) or a programmable switch application-specific integrated circuit (ASIC).

In some aspects, the techniques described herein relate to a method, wherein the software-based reset packet generator is executed by a central processing unit (CPU) of a server of the network.

In some aspects, the techniques described herein relate to a method, wherein deletion of the flow entry from the flow table is contingent upon an acknowledgement of the first TCP reset packet transmitted by the destination device.

In some aspects, the techniques described herein relate to a system including: a hardware accelerator that: maintains a flow table of flow entries corresponding to active flows; identifies, from the flow table, a flow entry corresponding to a flow between a source virtual machine and a destination virtual machine that satisfies predefined criteria for flow termination; transmits a flow termination request for the flow that includes flow match characteristics extracted from the flow entry of the flow table; transforms a first transport control protocol (TCP) reset packet according to a transformation defined in the flow entry for the flow in response to determining that the first TCP reset packet includes header information matching the flow match characteristics; and forwards the first TCP reset packet to a host of the destination virtual machine; and deletes the flow entry from the flow table; and a software-based reset packet generator that: receives the flow termination request; generates the first TCP reset packet; and transmits the first TCP reset packet back to the hardware accelerator.

In some aspects, the techniques described herein relate to a system, wherein the hardware accelerator: assesses traffic metrics for the flow and a corresponding reverse-direction flow; and determines that the predefined criteria for flow termination are satisfied when no packets have been received at the hardware accelerator for either the flow or the corresponding reverse-direction flow for a threshold period of time.

In some aspects, the techniques described herein relate to a system, wherein the hardware accelerator is further configured to: transmit flow termination request to the software-based reset packet generator, the flow termination requesting generation of the first TCP reset packet for the flow and a second TCP reset packet for a reverse-direction flow.

In some aspects, the techniques described herein relate to a system, wherein the software-based reset packet generator is further configured to: generate a pair of TCP reset packets in response to receiving the flow termination request, the pair of TCP reset packets including the first TCP reset packet for the flow and a second TCP reset packet for the reverse-direction flow; and transmit the pair of TCP reset packets to the hardware accelerator.

In some aspects, the techniques described herein relate to a system, wherein the hardware accelerator is further configured to: transform the second TCP reset packet according to a second flow entry of the flow table corresponding to the reverse-direction flow; and transmit the second TCP reset packet to a host of the source virtual machine.

In some aspects, the techniques described herein relate to a system, wherein the hardware accelerator is a field programmable gate array (FPGA) or a programmable switch application-specific integrated circuit (ASIC).

In some aspects, the techniques described herein relate to a system, wherein the software-based reset packet generator is executed by a server of a network that includes the hardware accelerator.

In some aspects, the techniques described herein relate to a system, wherein deletion of the flow entry from the flow table is contingent upon receipt of acknowledgment associated with the first TCP reset packet, the acknowledgment originating at the destination virtual machine.

In some aspects, the techniques described herein relate to one or more tangible computer-readable storage media encoding processor-executable instructions for executing a computer process for forcefully terminating a flow between two endpoints in a network, the computer process including: identifying a flow entry that corresponds to a flow that satisfies predefined criteria for flow termination, the flow entry residing in a flow table maintained by a hardware accelerator; transmitting, by the hardware accelerator, a flow termination request for the flow to a software-based reset packet generator, the flow termination request including flow match characteristics for the flow extracted from the flow entry of the flow table; in response to receiving the flow termination request, generating a first transport control protocol (TCP) reset packet at the software-based reset packet generator, the first TCP reset packet including header information that matches the flow match characteristics for the flow; transmitting, by the software-based reset packet generator, the first TCP reset packet to the hardware accelerator; at the hardware accelerator, creating a transformed TCP reset packet by transforming the first TCP reset packet according to a first transformation defined in the flow entry and transmitting the transformed TCP reset packet to a first one of the two endpoints; and deleting the flow entry from the flow table.

In some aspects, the techniques described herein relate to one or more tangible computer-readable storage media, wherein the computer process further includes: identifying, from the flow table, a reverse-direction flow extending in a direction opposite the flow and between the two endpoints; assessing traffic metrics for the flow and the reverse-direction flow; and determining the predefined criteria for flow termination are satisfied when no packets have been received at the hardware accelerator for either the flow or the reverse-direction flow for a threshold period of time.

In some aspects, the techniques described herein relate to one or more tangible computer-readable storage media, wherein the computer process further includes: transmitting a flow termination request to the software-based reset packet generator, the flow termination requesting generation of the first TCP reset packet for the flow and a second TCP reset packet for the reverse-direction flow.

In some aspects, the techniques described herein relate to one or more tangible computer-readable storage media, wherein the computer process further includes: generating a pair of TCP reset packets at the software-based reset packet generator and in response to the flow termination request, the pair of TCP reset packets including the first TCP reset packet for the flow and a second TCP reset packet for the reverse-direction flow; transmitting the pair of TCP reset packets from the software-based reset packet generator to the hardware accelerator; transforming, by the hardware accelerator, the second TCP reset packet according to a transformation defined with a flow entry corresponding to the reverse-direction flow within the flow table; and subsequent to transforming the second TCP reset packet, transmitting the second TCP reset packet to a second one of the two endpoints.

In some aspects, the techniques described herein relate to one or more tangible computer-readable storage media, wherein deletion of the flow entry from the flow table is contingent upon receipt of acknowledgment associated with the first TCP reset packet, the acknowledgment originating at the first one of the two endpoints. The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method for forcefully terminating a flow between a source device and a destination device in a network, the method comprising:

identifying, by a hardware accelerator, a flow entry in a flow table corresponding to a flow determined to satisfy predefined criteria for flow termination;

transmitting, by the hardware accelerator, a flow termination request for the flow to a software-based reset packet generator, the flow termination request including flow match characteristics for the flow extracted from the flow entry of the flow table;

generating, at the software-based reset packet generator, a first transport control protocol (TCP) reset packet that includes the flow match characteristics for the flow;

transmitting, by the software-based reset packet generator, the first TCP reset packet to the hardware accelerator;

at the hardware accelerator, creating a transformed TCP reset packet by transforming the first TCP reset packet according to a first transformation defined in the flow entry;

transmitting, by the hardware accelerator, the transformed TCP reset packet to the destination device; and deleting the flow entry from the flow table.

2. The method of claim 1, further comprising:

identifying, from the flow table, a reverse-direction flow that transports data packets from the destination device to the source device; and assessing traffic metrics for the flow and the reverse-direction flow, wherein the predefined criteria for flow termination are satisfied when no packets have been received at the hardware accelerator for either the flow or the reverse-direction flow for a threshold period of time.

3. The method of claim 2, wherein the method further comprises:

transmitting a flow termination request to the software-based reset packet generator, the flow termination requesting generation of the first TCP reset packet for the flow and a second TCP reset packet for the reverse-direction flow.

4. The method of claim 3, wherein the method further comprises:

generating a pair of TCP reset packets at the software-based reset packet generator, the pair of TCP reset packets including the first TCP reset packet for the flow and a second TCP reset packet for the reverse-direction flow;

transmitting the pair of TCP reset packets from the software-based reset packet generator to the hardware accelerator;

transforming, by the hardware accelerator, second TCP reset packet according to a transformation defined with a flow entry corresponding to the reverse-direction flow within the flow table; and subsequent to transforming the second TCP reset packet, transmitting the second TCP reset packet to the source device.

5. The method of claim 1, wherein the hardware accelerator is either a field programmable gate array (FPGA) or a programmable switch application-specific integrated circuit (ASIC).

6. The method of claim 1, wherein the software-based reset packet generator is executed by a central processing unit (CPU) of a server of the network.

7. The method of claim 1, wherein deletion of the flow entry from the flow table is contingent upon an acknowledgement of the first TCP reset packet transmitted by the destination device.

8. A system comprising:

a hardware accelerator that:

maintains a flow table of flow entries corresponding to active flows;

identifies, from the flow table, a flow entry corresponding to a flow between a source virtual machine and a destination virtual machine that satisfies predefined criteria for flow termination;

transmits a flow termination request for the flow that includes flow match characteristics extracted from the flow entry of the flow table;

transforms a first transport control protocol (TCP) reset packet according to a transformation defined in the flow entry for the flow in response to determining that the first TCP reset packet includes header information matching the flow match characteristics; and forwards the first TCP reset packet to a host of the destination virtual machine; and deletes the flow entry from the flow table; and a software-based reset packet generator that:

receives the flow termination request;

generates the first TCP reset packet; and transmits the first TCP reset packet back to the hardware accelerator.

9. The system of claim 8, wherein the hardware accelerator:

assesses traffic metrics for the flow and a corresponding reverse-direction flow; and determines that the predefined criteria for flow termination are satisfied when no packets have been received at the hardware accelerator for either the flow or the corresponding reverse-direction flow for a threshold period of time.

10. The system of claim 8, wherein the hardware accelerator is further configured to:

transmit flow termination request to the software-based reset packet generator, the flow termination requesting generation of the first TCP reset packet for the flow and a second TCP reset packet for a reverse-direction flow.

11. The system of claim 10, wherein the software-based reset packet generator is further configured to:

generate a pair of TCP reset packets in response to receiving the flow termination request, the pair of TCP reset packets including the first TCP reset packet for the flow and a second TCP reset packet for the reverse-direction flow; and transmit the pair of TCP reset packets to the hardware accelerator.

12. The system of claim 11, wherein the hardware accelerator is further configured to:

transform the second TCP reset packet according to a second flow entry of the flow table corresponding to the reverse-direction flow; and transmit the second TCP reset packet to a host of the source virtual machine.

13. The system of claim 8, wherein the hardware accelerator is a field programmable gate array (FPGA) or a programmable switch application-specific integrated circuit (ASIC).

14. The system of claim 8, wherein the software-based reset packet generator is executed by a server of a network that includes the hardware accelerator.

15. The system of claim 8, wherein deletion of the flow entry from the flow table is contingent upon receipt of acknowledgment associated with the first TCP reset packet, the acknowledgment originating at the destination virtual machine.

16. One or more tangible computer-readable storage media encoding processor-executable instructions for executing a computer process for forcefully terminating a flow between two endpoints in a network, the computer process comprising:

identifying a flow entry that corresponds to a flow that satisfies predefined criteria for flow termination, the flow entry residing in a flow table maintained by a hardware accelerator;

transmitting, by the hardware accelerator, a flow termination request for the flow to a software-based reset packet generator, the flow termination request including flow match characteristics for the flow extracted from the flow entry of the flow table;

in response to receiving the flow termination request, generating a first transport control protocol (TCP) reset packet at the software-based reset packet generator, the first TCP reset packet including header information that matches the flow match characteristics for the flow;

transmitting, by the software-based reset packet generator, the first TCP reset packet to the hardware accelerator;

at the hardware accelerator, creating a transformed TCP reset packet by transforming the first TCP reset packet according to a first transformation defined in the flow entry and transmitting the transformed TCP reset packet to a first one of the two endpoints; and deleting the flow entry from the flow table.

17. The one or more tangible computer-readable storage media of claim 16, wherein the computer process further comprises:

identifying, from the flow table, a reverse-direction flow extending in a direction opposite the flow and between the two endpoints;

assessing traffic metrics for the flow and the reverse-direction flow; and determining the predefined criteria for flow termination are satisfied when no packets have been received at the hardware accelerator for either the flow or the reverse-direction flow for a threshold period of time.

18. The one or more tangible computer-readable storage media of claim 17, wherein the computer process further comprises:

transmitting a flow termination request to the software-based reset packet generator, the flow termination requesting generation of the first TCP reset packet for the flow and a second TCP reset packet for the reverse-direction flow.

19. The one or more tangible computer-readable storage media of claim 18, wherein the computer process further comprises:

generating a pair of TCP reset packets at the software-based reset packet generator and in response to the flow termination request, the pair of TCP reset packets including the first TCP reset packet for the flow and a second TCP reset packet for the reverse-direction flow;

transmitting the pair of TCP reset packets from the software-based reset packet generator to the hardware accelerator;

transforming, by the hardware accelerator, the second TCP reset packet according to a transformation defined with a flow entry corresponding to the reverse-direction flow within the flow table; and subsequent to transforming the second TCP reset packet, transmitting the second TCP reset packet to a second one of the two endpoints.

20. The one or more tangible computer-readable storage media of claim 16, wherein deletion of the flow entry from the flow table is contingent upon receipt of acknowledgment associated with the first TCP reset packet, the acknowledgment originating at the first one of the two endpoints.

* * * * *